United States Patent [19]

Pfefferle

[11] 4,407,785

[45] Oct. 4, 1983

[54] METHOD OF CONDUCTING CATALYTICALLY PROMOTED GAS-PHASE REACTIONS

[75] Inventor: William C. Pfefferle, Middleton, N.J.

[73] Assignee: Engelhard Corporation, Iselin, N.J.

[21] Appl. No.: 39,925

[22] Filed: May 17, 1979

Related U.S. Application Data

[63] Continuation of Ser. No. 624,241, Oct. 20, 1975, abandoned, which is a continuation-in-part of Ser. No. 309,994, Nov. 28, 1972, abandoned.

[51] Int. Cl.³ .......................... B01J 8/04; B01J 12/00
[52] U.S. Cl. ..................................... 423/659; 423/210; 423/212; 423/213.2; 423/213.5; 423/245; 422/171; 422/177; 422/180
[58] Field of Search ................ 423/212, 659 H, 213.2, 423/213.5, 210 S, 245 S; 422/171, 177, 172, 180, 190

[56] References Cited

U.S. PATENT DOCUMENTS

| | | | |
|---|---|---|---|
| 1,919,626 | 7/1933 | Finn, Jr. | 422/171 |
| 3,163,256 | 12/1964 | Lanning | 422/171 X |
| 3,754,870 | 8/1973 | Carnahan et al. | 422/180 X |
| 3,785,781 | 1/1974 | Hervert et al. | 422/180 X |

Primary Examiner—Earl C. Thomas

[57] ABSTRACT

There is disclosed a method for conducting catalytic reactions, particularly hydrogenation or oxidation of vaporous, carbonaceous materials, utilizing a plurality of thin catalyst bodies in a spaced-apart relationship.

16 Claims, 1 Drawing Figure

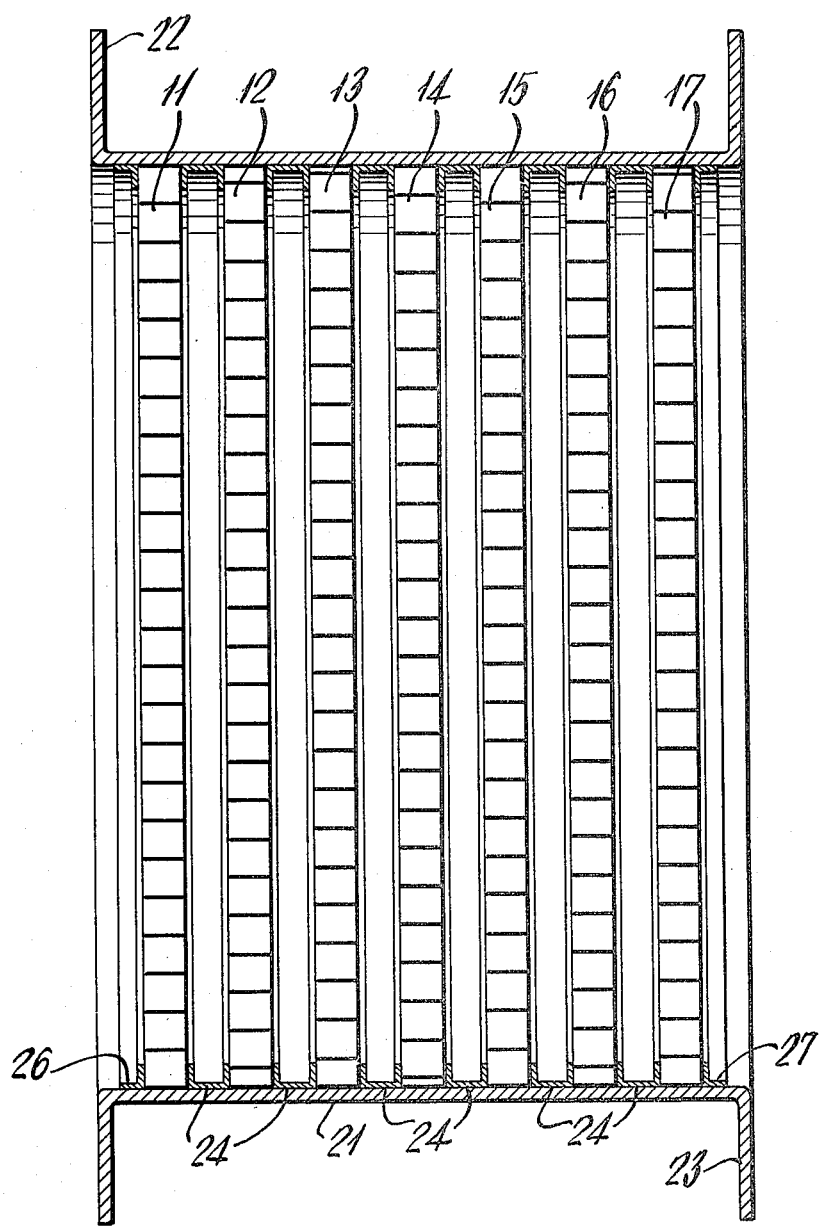

METHOD OF CONDUCTING CATALYTICALLY PROMOTED GAS-PHASE REACTIONS

This is a continuation of application Ser. No. 624,241, filed Oct. 20, 1975, and now abandoned, which in turn is a continuation-in-part of Ser. No. 309,994 of Nov. 28, 1972, and now abandoned.

This invention relates to a method of conducting vapor or gas phase reactions utilizing a plurality of thin catalytic bodies. More particularly the invention pertains to a method of hydrogenating or oxidizing gaseous materials capable of being hydrogenated or oxidized in the presence of free hydrogen or free oxygen, respectively, utilizing a plurality of thin catalytic bodies. In the method of this invention, a plurality of thin, honeycomb-type catalysts in a spaced-apart relationship is employed in a reaction of gaseous reactants to achieve efficient usage of the catalysts with a minimal retention time of the reactants within the catalysts. By reducing the retention time of the reactants within the catalysts, greater volumes of reactants can be catalytically reacted for a given volume of catalyst, and the response time of the system to an induced change in conditions can be reduced. This reduced response time is especially important in the catalytic oxidation of fuels for the production of power.

The use of honeycomb catalysts for vapor phase hydrogenation or oxidation is known in the art. Catalysts having a solid, unitary or monolithic skeletal body with a plurality of channels therethrough, generally referred to herein as honeycomb catalysts, can be oriented with the channels being generally in a direction of gas flow. Often, honeycomb type catalysts comprise an essentially chemically inert, substantially catalytically-inactive, rigid, solid material capable of maintaining a shape and strength at high temperatures, for instance, up to about 2500° to 3000° F. or more, as a skeletal structure. This structure defines a plurality of openings or channels therethrough in a direction of the desired fluid flow and the walls surrounding the channels are relatively thin. Advantageously, the structure can be shaped to fit the reaction zone into which it is to be disposed. The skeletal support has deposited thereon one or more metal components which are catalytically-active towards promoting the desired reaction. The catalytically-active metal component may be in a combined form, such as an oxide, or in the elemental state. The catalytically-active metal components may be carried by a less catalytically-active, or even essentially catalytically inert, support which may be, for example, ceramic in nature. The less catalytically-active material is carried by the skeletal support and can serve to increase the surface area of the catalyst. Advantageously, a catalytically-active metal oxide is deposited on the external surface of the skeletal support as a continuous or discontinuous thin deposit. Honeycomb catalysts, because of their rigidity of form and beneficial oriented flowthrough structures, have found application in many catalytic processes. The application of these catalysts have been noteworthy in hydrogenation and oxidation reactions, and particularly, in the oxidation of carbonaceous fuels or partially combusted carbonaceous fuels. For example, honeycomb-type catalysts have been employed to oxidize combustible materials in automobile exhaust, turbine exhaust, and the like. Honeycomb catalysts offer, as an advantage, a lower pressure drop than that observed with a bed of catalytically-active particles, particularly when employing velocities of the reactants which would enable mass transfer control of the reaction.

The use of honeycomb catalyst in catalytically promoted reactions has encountered some difficulties. The catalyst activity of a honeycomb catalyst is an important property, especially when used in mass transfer-controlled reactions. One problem experienced in these systems is, however, that the efficiency of the catalyst is dependent on the catalytic efficiency of the individual flowthrough paths of the catalyst. If, say, 10 percent of the flowthrough paths of a particular catalyst are inactive in a system in which each of the flowthrough paths receives an essentially equivalent amount of the reactants, 10 percent of the reactants would not be subjected to contact with active catalyst and would in effect bypass the catalytic reaction zone. In comparison, if a bed of particulate catalyst bodies be employed and 10 percent of the catalyst is inactive, essentially the entire amount of the reactants may still potentially contact the active catalyst that remains. Deactivation of flowthrough paths in honeycomb catalysts in not uncommon and can be caused by, for instance, normal use or catalyst poisons which may be associated with the reactant. Individual flowthrough paths of the honeycomb catalyst may also experience more rapid deactivation of the catalytically active metals thereon than other channels in the catalyst body because of variations in the flow from channel to channel. Additionally, as a result of difficulties involved in uniformly depositing the catalytically-active materials on the walls of the channels in the honeycomb catalyst, some of these may contain less or even none of the catalytic promoter. Hence, essentially little, if any, catalytic activity may be exhibited by several of the channels while a majority of the channels may, on an individual basis, provide quite satisfactory performance. Because of this, the material passing through the channels having less catalytic activity may not undergo the catalytic reaction or at least not to the extent experienced by other portions of the reactants. Further, when honeycomb catalysts are employed in exothermic catalytic reactions, they are subjected to excessive temperatures, often in excess of 2500° or 3000° F. or more, which can lead to deactivation of the catalytically-active components thereon and even adversely affect the skeletal support.

One solution to these problems that has been proposed is to increase the length of the flowthrough paths, thus a larger surface area of catalytically-active metals may be found in each flowthrough path. With a greater surface area, total deactivation of a flowthrough path due to use, catalyst poisons and the like requires a greater period of time. Upon partial deactivation, the reaction may be carried to a greater extent of completion by reducing the velocity of the reactants through the catalyst to compensate for such deactivation. It is clear that this method of compensating for loss of catalytic activity in the flowthrough paths is still limited in effectiveness in that if, say, 10 percent of the flowthrough paths were totally deactivated and the remaining paths provide 100 percent conversion of the gases passing therethrough, only a 90 percent maximum conversion could be achieved. Moreover, an increase in the length of the flowthrough paths may be disadvantageous, since as the mass of the catalyst is increased, a longer response time of the catalyst to a change in the system is observed. When, for instance, a catalyst is being employed to combust fuel to power a turbine used for automotive purposes, excessive response time is undesirable. For, in selective hydrogenation or oxidation reactions excessive amounts of catalyst often result in reduced selectivity.

By the present invention there is provided a method of conducting catalytically-promoted reactions utilizing a plurality of thin honeycomb catalyst bodies. The thin honeycomb catalyst bodies are in a spaced-apart relationship which enables efficient use of the catalyst in that the volume of catalyst required for a given degree of completion of reaction can be reduced as compared to the size of a single honeycomb catalyst structure required to effect the same degree of completion of the reaction under otherwise identical conditions. Further, the method of this invention minimizes effects due to non-uniform deposition of catalytically-active material on the walls of the skeletal structure of the honeycomb catalysts, as well as deactivation of a portion of the flowthrough paths of the catalyst.

In accordance with a feature of the invention, a method for conducting catalytically-promoted reactions of gas phase reactants comprises contacting the reactants serially with a plurality of honeycomb catalyst bodies having gas flowthrough paths therethrough, these paths being oriented essentially in the overall longitudinal direction of gas flow through the plurality of bodies. These catalyst bodies are disposed in a spaced-apart relationship such that the effluents from the flowthrough paths of one catalyst body, prior to contacting a subsequent such catalyst body, are commingled in turbulent flow while passing through the open space between the one body and the subsequent body.

In one aspect, the gases are passed through adjacent flow-through paths with substantially no flow communication between adjacent paths, since the flowthrough paths (channels) preferably do not have communication with adjacent channels to a substantial extent. In one aspect of the invention, the length of each individual flowthrough path divided by the square root of its individual cross-sectional area is less than about 20. In another aspect of the invention, each of the plurality of honeycomb catalyst bodies is about 0.1 to 1 inch in thickness in the direction of gas flow.

These and other aspects and advantages of the present invention will be apparent from the following detailed description.

The sole FIGURE of the drawing is a longitudinal sectional view through an assembly of thin honeycomb catalyst bodies disposed in spaced-apart relationship, suitably for use in carrying out the method of the invention for conducting catalytically-promoted gas phase reactions.

Referring to the drawings, a plurality of honeycomb-type catalyst elements 11, 12, 13, 14, 15, 16, and 17 is shown in central cross-section, disposed in axial alignment within an enclosure or casing 21 having mounting flanges 22 and 23 individually at each end of the assembly. Adjacent pairs of catalyst elements are maintained in spaced-apart relationship by intervening spacers 24 affixed to the interior of the casing 21, while the end elements 11 and 17 are maintained in longitudinal position within the casing by retainers 26 and 27 fixed within the entrance and exit openings of the assembly.

Mass transfer-controlled reactions are those reactions which are controlled by the velocity of the reactants passing through the catalyst body and by the type of flow of the reactants, i.e., degree of turbulence, through the catalyst body. These reactions take place essentially at a catalytic rate equal to the rate of mass transfer of reactants to the catalyst surface. Thus the reaction rate is controlled or limited primarily by the extent of reactant-catalytic surface contact. By increasing the velocity of the reactants, the period of contact of a turbulent flow of fluid with the catalytically-active metal component on the walls of the honeycomb structure is reduced, but the rate of mass transfer is increased since the distance for diffusion of the reactants in the gas phase to contact the catalyst is less. Hence the degree of completion of the reaction is not lessened in proportion to the reduction in catalytic time. On the other hand, if the velocity of the reactant gases through the flowthrough paths of the catalyst is such that the flow is laminar in nature, there is no offsetting compensation for the reduction in contact time due to an increase in velocity since the distance required for the reactants to diffuse through the vapor phase reactant stream and contact the catalytically-active surface is essentially unchanged. In practice, when employing gas velocities which provide laminar flow, the pattern of flow of the entering gases at the initial portion of the flowthrough paths will resemble turbulent flow until the flow pattern becomes settled. Velocities of the reactants which fall between laminar and turbulent flow, e.g., transitional flow, may also be employed. However, due to the generally unpredictable nature of transitional flow and the possibility of significant variations in the pattern of flow with small variations in velocity, velocities in this range may not find as convenient an application to provide stable conversion rates in mass transfer-controlled reactions as velocities which provide laminar or turbulent flow.

The thin honeycomb catalysts employed in the process of this invention has a solid, unitary or monolithic skeletal body with a plurality of channels therethrough which are generally essentially oriented in the same direction as the flow of the reactants through the catalyst, and have deposited on the walls defining the channels therethrough one or more components which are catalytically-active towards promoting the desired chemical reaction. The thickness of the catalyst in the direction of reaction mixture or gas flow advantageously is from about 0.1 to 1 inch, preferably about 0.2 to 0.9, more preferably about 0.5 to 0.7, inch. The face of the honeycomb catalyst, that is the cross-sectional portion of the inlet of the catalyst, which face may be essentially perpendicular to the direction of flow of the reactants, may be widely varied in dimension and in exterior configuration and preferably is designed to fit the reaction zone in a manner which inhibits flow of the reactant gases around the catalyst body. By increasing the dimensions of the face of the catalyst while maintaining a given cross-sectional area per channel, a greater number of flowthrough paths can be provided, and hence, the surface area of active catalyst available to contact the reactants is increased.

The flowthrough paths or channels of the honeycomb catalyst often have a cross-sectional area of less than about 0.02, preferably less than 0.01, square inch. Desirably, at least about 10 or 100 flowthrough paths are provided per square inch of cross-section, and often up to about 2500 or more flowthrough paths may be provided per square inch. The cross-sectional area of each flowthrough path and the length of the flowthrough paths may be in such a relationship that the length of the flowthrough path divided by the square root of the cross-sectional area of the flowthrough path is less than about 20, preferably less than about 16.

A plurality of these honeycomb catalyst bodies are employed in a reaction zone in a spaced-apart relationship. The distance between these catalyst bodies may vary over a wide range, and when more than two catalyst bodies are employed spaced-apart in a reaction zone, the distance between the catalyst bodies may vary. Sufficient space is provided between at least two, and preferably between each, of the catalyst bodies to enable commingling of the gases emanating from one catalyst body prior to passing through the next downstream catalyst body. Desirably, the velocity of the gases through the space between the catalyst bodies is turbulent so as to provide a more effective admixing of the reacted and unreacted gases. The spaces between the catalyst bodies may be referred to as open spaces, in the accepted sense of the word open, and thus there is no obstruction to the mixing between the bodies. The space between each catalyst required to obtain the desired mixing or commingling is dependent upon several variables such as the cross-sectional area of the flowthrough paths, the velocity of the gases, and the like. Preferably, the catalyst bodies are spaced apart at least the length of the flowthrough paths through the immediate upstream catalyst. Normally, the honeycomb catalyst bodies are at least about 0.2, and often at least about 0.4, inch apart. Often this distance may not exceed about 2 or 3 inches. The honeycomb catalyst bodies may be arranged such that the flowthrough paths of one catalyst body can be in or out of alignment with those of the next downstream catalyst body. When the flowthrough paths of adjacent honeycomb catalyst bodies are aligned, a greater distance between the catalyt bodies may be advantageous to provide the desired degree of mixing of the reactants and catalytically reacted products than the distance employed between catalyst bodies whose flowthrough paths are not aligned. The desired degree of commingling of these gases in the space between catalyst bodies may vary over a wide range. The degree of mixing should, however, be sufficient to insure that the composition of the gases entering flowthrough paths of the next adjacent catalyst body does not vary substantially, that is, within 10, preferably 5, percent based on any one component. In this manner, essentially unreacted gases which exit from a deactivated flowthrough path of a first catalyst body will commingle with at least partially reacted gases emitted from adjacent, catalytically-active flowthrough paths. The admixing of the gases provides a more or less uniform composition of gas at any point entering the next adjacent catalyst body. Excessively high concentrations or low concentrations of any component in the gas entering the next adjacent catalyst body will thus be avoided. By maintaining a substantially constant concentration of gases entering each catalyst body, several advantages are realized. The reactions can more precisely be controlled with respect to degree of completion, reaction conditions, response to change in reaction conditions, and the like. Furthermore, the method of this invention enables, if desired, a higher degree of completion of the catalytic reaction to be achieved than if a single catalyst body were employed having essentially the same overall volume.

At least two, preferably four or more, spaced-apart honeycomb catalyst bodies are employed in the method of this invention. The number of catalyt bodies utilized in a particular embodiment is dependent upon various considerations such as, the desired degree of completion of the reaction, the velocity of the reactant gases through the reaction zone, the thickness of each of the honeycomb catalyst bodies, the distance between each of the catalyst bodies, the uniformity of deposition of the catalytic agent in the catalyst body, the rate of deactivation of the catalyst as a consequence of the reaction taking place or due to catalyst poisons which may be contained in the reactant gases, or produced by the reaction, the particular catalytically-active metal component employed, and the like. A higher degree of completion of the reaction may be obtained by increasing the distance between the catalyst bodies to provide a more thorough mixing of the reaction gases from each of the flowthrough paths to assist in compensating for any catalytically-inactive flowthrough paths.

The plurality of spaced-apart, thin honeycomb catalyst bodies are preferably employed for conducting hydrogenation or oxidation of carbonaceous materials. The reaction conditions required to provide an advantageous result may depend in part upon the particular reaction being conducted and the nature of the catalytically-active components contained on the catalyst. Generally, the hydrogenation reactions are conducted at temperatures ranging from about 50° to 1200° F., preferably about 100° to 1000° F. under a pressure up to about 5000 psig or more, preferably up to about 1000 psig. The conditions selected insure that the reactants are in the vaporous phase. By increasing the velocity of the reactants through the catalyst, the build-up of temperature due to the exothermic nature of the reaction can be minimized, thus it is possible to avoid undesirable side reactions such as hydrocracking and the like. Similarly, oxidation reactions can be conducted at desirable temperatures, for instance, from about 50° to 3000° F. or more, preferably about 80° to 2500° F. As a practical consideration, excessively low temperatures, e.g., up to about 80° F. may result in the condensation of water, a product of reaction. It is, however, possible to conduct oxidation reactions in accordance with this method at temperatures below ambient and even as low as the temperature of liquid nitrogen. The use of such low temperatures for oxidation may be beneficial when, for example, the oxidation reaction is used to remove hydrogen from oxygen as a means to purify the oxygen. The oxidation reaction of the present method is particularly advantageous in treating nitrogen-containing materials since the overall reaction temperature can be maintained at a sufficiently low temperature that the production of undue amounts of nitrogen oxides is avoided without unduly compromising the efficiency of combustion.

In gaseous reactions, additional gases, which are essentially inert to the reaction system, may be present in the reactant gases. Such additional gases serve to absorb heat produced by the exothermic reactions thus enabling a lower, overall exothermic temperature to be achieved. Further, additional inert gases can be used to provide a higher gas velocity through the catalyst bodies without increasing the amount of reactants flowing through. Often the amount of additional gas is from about 10 to 95, preferably about 25 to 90, volume percent of the total gases passing through the reactor. The same effects provided by the additional gases may be achieved by using a stoichiometric excess of one of the reactants.

Hydrogenation reactions conducted in accordance with this invention can be defined as the chemical combination of hydrogen with a carbonaceous material. By the term carbonaceous material it is meant that the material contains carbon. Preferably, the carbonaceous material is an unsaturated organic compound, e.g. having from 1 to about 25 carbon atoms per molecule, such as aromatic and olefinic hydrocarbons, acetylenes, unsaturated organic acids, ethers and esters, and the like. The hydrogen employed in the hydrogenation reaction may preferably be in the neighborhood of about 5 to 30 volume percent of the reactant gases.

The catalysts of the present invention can be employed to promote the oxidation of various chemical feedstocks through contact with molecular oxygen. The feeds are materials which are subject to oxidation, can contain hydrogen and/or contain carbon. Carbon-containing materials may, therefore, be termed carbonaceous, whether they are organic or inorganic in character. For instance, hydrogen; carbonaceous materials which contain hydrogen such as alkalines, alkenes, aromatics, etc. of preferably 1 to 25 carbon atoms; nitrogen-containing compounds such as ammonia, amines of up to 25 carbon atoms; and the like. The catalyst system of the present invention is thus useful in, for instance, promoting the oxidation of hydrocarbons, oxygen-containing organic components, carbon monoxide, and the like. These types of materials may be present in exhaust gases from the combustion of carbonaceous fuels, and thus the catalysts of the present invention are useful in promoting the oxidation of such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. It is desirable to have an amount of free oxygen present in the reactant gases which is at least sufficient for the complete combustion on a stoichiometric basis of hydrogen to water and carbon in carbon-containing materials to carbon dioxide. Preferably, the oxidation reaction of the present invention, when employed to remove carbon monoxide and hydrocarbons from a partially combusted effluent, is run under such conditions that the nitrogen in nitrogen-containing materials or air, if employed as the oxidizing material, is not unduly converted to nitrogen oxides which are atmospheric pollutants. The products from the oxidation contain a greater weight ratio of oxygen to carbon than in the feed material subjected to oxidation. Many such reaction systems are known in the art.

The honeycomb catalyst bodies employed in this invention have a solid, unitary or monolithic skeletal body which is comprised of chemically-inert, substantially catalytically-inactive, rigid, solid material capable of maintaining its shape and strength under the conditions to which the catalyst will be subjected during operation, start-up, or shut down or during regeneration. In many instances, the skeletal structure should retain its properties at temperatures of up to about 3000° F. or more. The support may have a low thermal coefficient of expansion, good thermal shock resistance, and low thermal conductivity. Often, the skeletal support is prorous but its surface may be relatively non-porous, and it may be desirable to roughen its surface so that it holds the catalyst coating better, especially if the support is relatively non-porous. The support may be metallic or ceramic in nature or a combination thereof. Particularly advantageous materials for the construction of the skeletal structure are, for example, alpha-alumina, silicon nitride, cordierite, other ceramic-type materials, and the like. The skeletal structure defines therewithin the flowthrough paths or channels of the type discussed above, and preferably these channels do not have communication with adjacent channels to a substantial extent. The catalysts generally have one or more metal components which are catalytically-active towards promoting the desired oxidation or hydrogenation reactions. When employing high temperatures for the desired reaction, materials normally considered to be relatively inactive or insufficiently active to promote adequately the oxidation or hydrogenation reactions at lower temperatures, may be suitable. The catalytic metal may be in a combined form, such as an oxide, rather than being in the elemental state, and preferably the catalytic metal compound is carried by a less catalytically-active, or even an essentially inert, support which may be, for instance, ceramic in nature. In these catalysts, the more catalytically-active metal components are often a minor amount of the catalyst, and the skeletal support is the major proportion. The catalytically-active metals, especially for oxidation or hydrogenation reactions, are often in the heavy metal groups of the periodic chart of the elements, and thus in groups IB IIB, or III to VIII or in the rear earth or lanthanide series. The catalytically-active forms of these metals are used and the oxides of a given metal, e.g., aluminum, may be more active or less active, depending on its physical state, degree of hydration and other factors as is known in the art. Generally speaking, however, the catalytic components of the metals of groups III and IV, for instance, silica, alumina, zirconia, and their mixtures, are less active than the catalytic forms of the group VIII metals, particularly the platinum group metals, such as platinum, palladium and rhodium; or the metals of groups IB, IIB, V, VI, VII, the iron series of group VIII and the rare earth metals, e.g., Cu, Cr, Ni, Co, V, Fe, Ce and the like. In some preferred forms, the catalysts used may be composed of both a more active component having one or more metals from groups IB, IIB, and V to VIII or from the rare earths, along with one or more less catalytically-active components of metals from groups III and IV, and these combinations may or may not be, but preferably are, supported on a still less active, and even essentially inert, carrier. For example, such a catalyst may contain 1% platinum in active form and 10% alumina in active form carried on a honeycomb alpha-alumina, silicon nitride, or cordierite support, or the platinum may be replaced by minor amounts of chromium and cerium oxides. The less catalytically-active material generally increases the surface area of the catalyst. Advantageously, a catalytically-active metal oxide is deposited upon the external surface of the skeletal support as a continuous thin deposit or as a discontinuous thin deposit. The catalysts often have a surface area, including the area of pores in the surface, of at least about 10, preferably, at least about 50, square meters per gram. Catalysts of this type are disclosed, for instance, in U.S. Pat. No. 3,565,830, herein incorporated by reference.

Different supports and/or catalytically-active components thereon may be employed for each thin catalyst body in the catalytic process of the present invention. In this manner, the catalytic reactor zone may be designed for a particular application. For instance, a catalytic reaction to treat exhaust from internal combustion engines might employ for the first several catalyst bodies a support resistant to high temperatures and which may serve to remove heat from the gases. The subsequent thin catalysts may employ supports which need not be of high heat resistance and which may employ different catalytically active components. Similarly, the cross-sectional area of the flowthrough paths and/or the length of the flowthrough paths may vary from one thin catalyst to another in the reaction zone to obtain a desired rate of conversion in each catalyst stage.

By way of example, a catalytic reactor is prepared having seven honeycomb catalyst bodies about one-half inch thick in the direction of gas flow and each being spaced approximately one-half inch apart from the next upstream body. The total catalyst volume in the catalytic reaction is about 0.3 cubic foot. Each of the catalyst bodies is comprised of a cordierite honeycomb support having 1 percent platinum in active form and 10 percent alumina in active form carried thereon. The cross-sectional area of each of the flowthrough paths of the catalyst bodies is about $1.3 \times 10^{-3}$ square inch with 68 percent of the face of the catalyst body being open area. To the catalytic reactor is fed a mixture of about 35 pounds of propane per hour and about 1365 pounds of air at a temperature of about 750° F. and an analysis of the gases show that a conversion of about 99 percent of the propane occurs. For comparison, if a single honeycomb catalyst body were employed to achieve a 99 percent conversion under otherwise identical conditions, a catalyst volume of about 0.46 cubic foot would be required. This latter amount of catalyst is considerably greater than that needed to reach the same conversion in accordance with the present invention in laminar flow-type, mass transfer controlled reactions. If thinner sections of catalyst had been employed in the example of this invention an even greater advantage would have been obtained.

What is claimed is:

1. A method for carrying out a catalytically promoted gas phase reaction comprising passing gaseous reactants through and in contact with a plurality of unobstructed parallel flowthrough paths of a plurality of separate segments of honeycomb catalyst in series, discharging gaseous reaction products and unconverted reactants from each segment of said honeycomb catalyst into an unobstructed mixing zone comprising an open space between adjacent segments which is free from catalyst and packing material and having an unobstructed cross-sectional area which, normal to the general direction of gas flow through said catalyst segments, is substantially equal to the cross-sectional area of the segment of honeycomb catalyst immediately preceding the mixing zone in the direction of gas flow, commingling the reaction products and unconverted reactants within said mixing zone, and supplying the resulting mixture of gaseous reaction products and unconverted reactants from said mixing zone to the next succeeding segment of said catalyst in the direction of gas flow, each segment of said honeycomb type catalyst being spaced from each adjacent segment by a distance at least equal to the flowthrough path channel length of the immediately upstream catalyst segment whereby the effect on the treated gases of variations in catalytic activity among the flow paths of the segments of said honeycomb-type catalyst is minimized by the commingling in said mixing zone, and discharging the resulting gaseous products of reaction from the last of said segments of honeycomb-type catalyst in the direction of gas flow.

2. A method according to claim 1 in which the catalytically promoted gas phase reaction is oxidation of a gaseous material susceptible of catalytic oxidation with free oxygen.

3. A method according to claim 1 in which the catalytically promoted gas phase reaction is hydrogenation of a gaseous material susceptible to catalytic hydrogenation with free hydrogen.

4. A method according to claim 1 wherein each of said segments of honeycomb catalyst has a length within the range of 0.1 to 1 inch in the direction of gas flow.

5. A method according to claim 4 wherein said segments of honeycomb catalyst is comprised of a skeletal support having deposited thereon at least one catalytically-active metal component which promotes the gas phase reaction.

6. A method according to claim 1 wherein the length of each individual flowthrough path divided by the square root of its cross-sectional area is less than about 20.

7. The method of claim 1 in which the length of said mixing zone is at least about 0.4 inch.

8. The method according to claim 1 including commingling the resulting reactants and unreacted products in turbulent flow in said mixing zone.

9. A method according to claim 1 including passing the gaseous reactants through and in contact with said segments of honeycomb catalyst with substantially no flow communication between adjacent flowthrough paths of the same catalyst segment.

10. A method according to claim 1 in which the length of each individual flowthrough path divided by the square root of its cross-sectional area is less than about 20 and the length of each individual flowthrough path is from about 0.1 to 1 inch.

11. A method according to claim 10 in which the length of each individual flowthrough path divided by the square root of its cross-sectional area is less than about 16 and said segments are spaced from each adjacent segment by a distance of at least 0.1 inch.

12. In a reactor for conducting a catalytically-promoted gas phase reaction comprising a honeycomb-type catalyst structure of uniform cross-sectional area having a plurality of thin-walled unobstructed flowthrough path channels extending therethrough for the passage of fluid therethrough enclosed in a casing having substantially the same cross-sectional area as said catalyst structure, said casing surrounding and containing said catalyst and provided with an entrance and an exit for gases at opposite ends thereof, the improvement which comprises disposing a plurality of segments of said honeycomb catalyst within said casing intermediate said inlet and outlet in a spaced relationship to one another such that said segments are spaced from adjacent segments by a distance at least equal to the flowthrough path channel length of the immediately upstream catalyst segment, thereby providing one or more unobstructed mixing zones each comprising an open space free from catalyst and packing material, one such mixing zone being disposed between adjacent ones of said segments, and such that the channels in each segment of said catalyst structure are oriented in the direction of gas flow through said reactor from said inlet to said outlet whereby gaseous reactants and resulting reaction products of catalytic reaction in passing from said inlet to said outlet pass through said catalyst segments and said mixing zones alternately in series and are admixed with one another in the mixing zones intermediate said segments, said mixing zones being defined respectively by the outlets and inlets of adjacent segments of catalyst structure in the direction of flow of said gases whereby the effect on the treated gases of variations in catalytic activity among the flow paths in separate segments of said honeycomb catalyst is minimized by the commingling in said mixing zone.

13. The reactor of claim 12 wherein the length of each flowthrough path channel divided by the square root of its individual cross sectional area is less than about 20.

14. The reactor of claim 12 or claim 13 wherein each segment is spaced from each adjacent segment by a distance of at least 0.1 inch.

15. The reactor of claim 14 wherein each segment is about 0.1 to 1 inch in thickness in the direction of gas flow.

16. The reactor of claim 12 or claim 13 wherein said flowthrough path channels are of substantially uniform cross-sectional area.

* * * * *